(12) United States Patent
Hayashide et al.

(10) Patent No.: US 8,531,530 B2
(45) Date of Patent: Sep. 10, 2013

(54) ADJUSTING METHOD FOR A LENS UNIT, LENS UNIT AND IMAGE READING APPARATUS

(75) Inventors: Tadao Hayashide, Utsunomiya (JP); Takeyoshi Saiga, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/312,357

(22) Filed: Dec. 6, 2011

(65) Prior Publication Data

US 2012/0140111 A1    Jun. 7, 2012

(30) Foreign Application Priority Data

Dec. 6, 2010  (JP) ................................ 2010-271500
Dec. 2, 2011  (JP) ................................ 2011-264734

(51) Int. Cl.
*H04N 17/00*  (2006.01)
*H04N 5/232*  (2006.01)

(52) U.S. Cl.
USPC .......................................... 348/188; 348/345

(58) Field of Classification Search
USPC ..... 348/187, 188, 335, 345, 360; 396/73–75, 396/77, 79, 82
See application file for complete search history.

(56) References Cited

U.S. PATENT DOCUMENTS

| | | | | |
|---|---|---|---|---|
| 5,790,901 A | * | 8/1998 | Nakayama et al. | 396/82 |
| 5,802,405 A | * | 9/1998 | Sugimoto | 396/82 |
| 6,097,548 A | * | 8/2000 | Funahashi et al. | 359/694 |
| 6,993,256 B2 | * | 1/2006 | Ogg et al. | 396/81 |
| 7,440,007 B2 | * | 10/2008 | Hoshi | 348/208.7 |
| 7,479,982 B2 | * | 1/2009 | Otani et al. | 348/188 |
| 2004/0184795 A1 | * | 9/2004 | Okawara | 396/1 |
| 2009/0273680 A1 | * | 11/2009 | Palum | 348/187 |

FOREIGN PATENT DOCUMENTS

| | | |
|---|---|---|
| JP | 2000-171705 A | 6/2000 |
| JP | 2004-78149 A | 3/2004 |

* cited by examiner

*Primary Examiner* — Timothy J Henn
(74) *Attorney, Agent, or Firm* — Rossi, Kimms & McDowell LLP

(57) ABSTRACT

An adjusting method for a lens unit used in an image reading apparatus which images image information of an original onto an image reading unit by the lens unit and reads the image information, the lens unit including rotationally-symmetrical lenses, a lens barrel including the rotationally-symmetrical lenses and an adjusting lens, the adjusting method including: performing rotational adjustment of the lens barrel with respect to the adjusting lens; and imaging an adjusted chart onto one-dimensional photoelectric transducers via the lens unit, obtaining contrast depth characteristics of images corresponding to at least three angles of field of the lens unit among images of the adjusted chart, and, according to the obtained contrast depth characteristics, performing position adjustment of the adjusting lens in at least one of an array direction of the one-dimensional photoelectric transducers, a direction orthogonal to the array direction and an optical axis direction of the lens unit.

17 Claims, 10 Drawing Sheets

ADJUSTING METHOD FOR A LENS UNIT, LENS UNIT AND IMAGE READING APPARATUS

BACKGROUND OF THE INVENTION

1. Field of the Invention

The present invention relates to an adjusting method for an image reading lens unit used for reading image information on an original table, and more particularly, to an adjusting method for an image reading lens unit suitable for allowing the image reading lens unit to sufficiently deliver its design performance in, for example, image scanners and copy machines.

2. Description of the Related Art

Conventionally, in an image reading apparatus, image information of an original placed on the surface of an original table glass is read by causing a carriage, in which an illumination system, a reflection mirror, a lens unit, a reading unit and the like are integrally housed, to scan in a sub-scanning direction by a sub-scanning mechanism. The read image information is sent to a personal computer or the like, which is an external apparatus, through an interface. The lens unit images light from the original onto the reading unit. The reading unit is a charge coupled device (CCD) linear sensor (photoelectric transducers), and is formed of a plurality of light receiving elements arrayed in a main scanning direction.

In order to reduce the size of an image reading apparatus (image scanner), a reduction in the size of the carriage is effective. An image reading apparatus is known in which, in order to reduce the size of the carriage, the distance from the original to the reading unit (reading distance) is shortened by arranging the lens unit to have a wider angle of field (Japanese Patent Application Laid-Open No. 2000-171705). In order to increase the angle of field and thereby shorten the reading distance, it is effective to incorporate a lens having an anamorphic surface (anamorphic lens) in the lens unit. However, in the case where an anamorphic lens is used, the imaging performance becomes rotationally asymmetric with respect to an optical axis.

Accordingly, it is necessary to regulate the main scanning direction of the lens unit and the sub-scanning array direction of the image reading CCD, to thereby align the main scanning direction of the lens unit with the sub-scanning array direction of the image reading CCD. In addition, in the manufacturing process of the lens unit, a decentration error may occur in which the anamorphic lens is fixed off a reference axis of a lens barrel. A decentration error involves degradation of the imaging performance. On this issue, an image reading apparatus having a rotation adjusting mechanism is proposed, in which degradation of the imaging performance in a one-dimensional CCD array area is reduced by rotationally adjusting a group of rotationally-symmetrical lenses (Japanese Patent Application Laid-Open No. 2004-078149).

The use of the rotation adjusting mechanism (coaxiality maintaining unit) enables rotational adjustment with respect to each other with reference to the optical axis. However, the decentration having occurred remains, and there is a limit to the improvement of the imaging performance. For example, in the case where lens decentration is present in the main scanning direction, so-called asymmetric blur occurs in which the contrast performance of an image imaged on the CCD is different between two end portions of the CCD. This is not desirable in terms of imaging performance. In the case where the lens barrel is rotated in this condition, the asymmetric blur is reduced according to the amount of rotation. However, the amount of decentration increases in the sub-scanning direction, and coma aberration and the like occur in the sub-scanning direction.

Rotating the lens barrel by 90 degrees eliminates the asymmetric blur. However, other aberrations occur, and therefore, the best imaging performance is not always achieved. In the rotational adjustment, the best condition is obtained at some angle between 0 and 90 degrees and the optical performance is improved compared to the initial state. However, the optical performance is inferior compared to ideal optical state that may be achieved when there is no occurrence of decentration. In addition, the method of using the rotation adjusting mechanism reduces the performance degradation due to decentration, but the method does not produce any other improvements. In particular, the method cannot deal with the occurrence of aberrations due to variations in lens thickness and lens surface accuracy.

For example, when the lens thickness varies, so-called field curvature occurs in which the contrast performance of an image imaged on the CCD is different between the two end portions and the central portion of the CCD. No improvement is obtained for this by rotating the lens barrel. In order to improve the performance of the image reading apparatus, it is necessary not only to improve the design performance but also to reduce the performance degradation due to manufacturing variations in lenses described above.

SUMMARY OF THE INVENTION

The present invention has an object to provide an adjusting method for an image reading lens unit capable of correcting remaining aberrations that cannot be corrected by rotational adjustment of a lens barrel, and reading image information with high accuracy.

According to the present invention, there is provided an adjusting method for a lens unit used in an image reading apparatus which images image information of an original onto an image reading unit by the lens unit and reads the image information, the lens unit including a plurality of rotationally-symmetrical lenses, a lens barrel including the plurality of rotationally-symmetrical lenses and an adjusting lens disposed at an end portion of the lens barrel, the adjusting method including: performing rotational adjustment of the lens barrel with respect to the adjusting lens by rotating the lens barrel around symmetry axes of the plurality of rotationally-symmetrical lenses of the lens barrel; and imaging an adjusted chart irradiated with a beam emitted from a light source apparatus onto one-dimensional photoelectric transducers via the lens unit, obtaining contrast depth characteristics of images corresponding to at least three angles of field of the lens unit among images of the adjusted chart imaged onto the one-dimensional photoelectric transducers, and, according to the obtained contrast depth characteristics, performing position adjustment of the adjusting lens with respect to the lens barrel in at least one of an array direction of the one-dimensional photoelectric transducers, a direction orthogonal to the array direction and an optical axis direction of the lens unit.

Further features of the present invention will become apparent from the following description of exemplary embodiments with reference to the attached drawings.

DESCRIPTION OF THE EMBODIMENTS

Figure 1A:
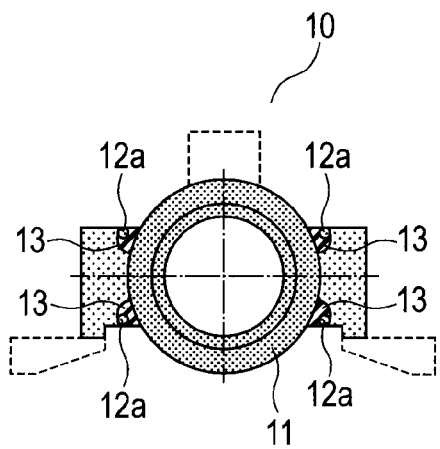
FIG. 1A is a main part schematic view of an adjusting method for a lens unit according to a first embodiment of the present invention.
Figure 1B:
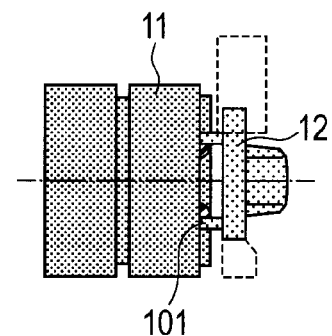
FIG. 1B is a main part schematic view of the adjusting method for a lens unit according to the first embodiment of the present invention.
Figure 1C:
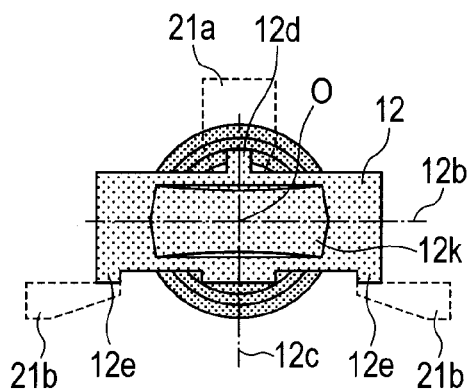
FIG. 1C is a main part schematic view of the adjusting method for a lens unit according to the first embodiment of the present invention.

Hereinbelow, embodiments of the present invention are described with reference to the drawings. A lens unit to be adjusted by an adjusting method for a lens unit of the present invention is a lens unit (imaging optical system) used in image reading apparatuses, such as image scanners and copy machines, for imaging image information of an original onto an image reading unit using the lens unit and thereby reading the image information. The lens unit includes a plurality of rotationally-symmetrical lenses, a lens barrel having the rotationally-symmetrical lenses therein and an adjusting lens disposed at the end portion of the lens barrel. The adjustment of the lens unit involves position adjustment of the adjusting lens with respect to the lens barrel and rotational adjustment of the lens barrel with respect to symmetry axes of the rotationally-symmetrical lenses.

The adjusting lens includes an optical part formed of an anamorphic surface having a refraction action, a flange part for retaining the optical part and structural parts of three or more convex portions or concave portions provided on the flange part. Here, at least two of the structural parts are provided on the lens barrel side, and fixed to the lens barrel with an adhesive after the position adjustment of the adjusting lens with respect to the lens barrel and the rotational adjustment of the lens barrel with respect to the symmetry axes of the rotationally-symmetrical lenses. In an adjusting method for the adjusting lens, position adjustment in three axial directions orthogonal to one another and tilt adjustment in three directions around the three axes are performed for the adjusting lens.

According to one mode of the position adjustment in the optical axis direction among those adjustments, the adjusting lens is adjusted using spacers, and subsequently, the adjusting lens and the lens barrel are fixed to each other with an adhesive. In the adjustment of the lens unit, an adjusted chart irradiated with a beam emitted from a light source apparatus is imaged onto one-dimensional photoelectric transducers. Contrast performance is measured in images corresponding to at least three angles of field of the lens unit among images of the adjusted chart imaged onto the photoelectric transducers. Then, according to the contrast performance, the adjusting lens is adjusted in at least one direction of an array direction of the photoelectric transducers, a direction orthogonal to the array direction and an optical axis direction.

The at least three angles of field are a central angle of field and angles of field of both end portions with respect to the central angle of field, and differences in the contrast performance and the average contrast performance are calculated for images of the adjusted chart, corresponding to the central angle of field and the angles of field of both end portions with respect to the central angle of field. Then, the position adjustment is performed by moving the adjusting lens in the optical axis direction, the array direction of the photoelectric transducers, the orthogonal direction and the like so as to correct the differences in the contrast performance.

First Embodiment

Figure 1D:
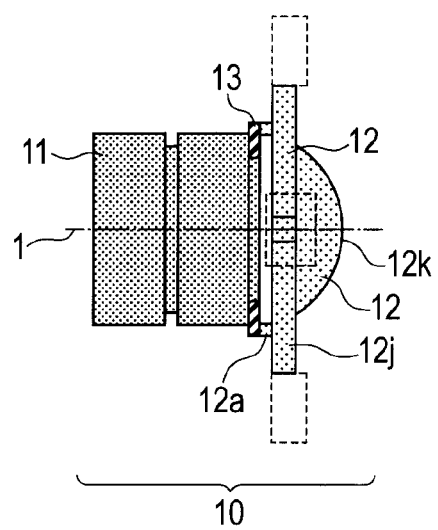
FIG. 1D is a main part schematic view of the adjusting method for a lens unit according to the first embodiment of the present invention.
Figure 2:
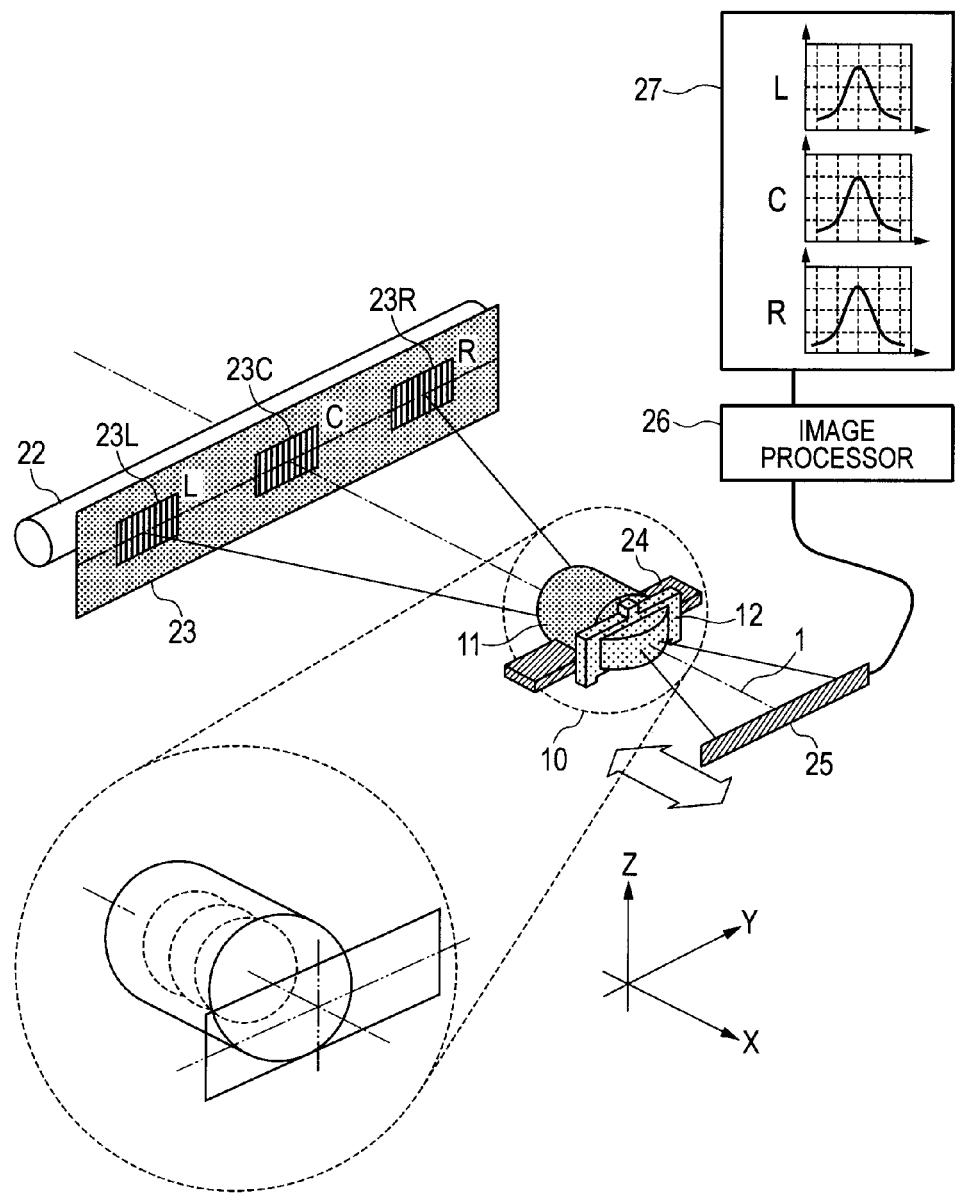
FIG. 2 is a main part schematic view of the adjusting method for a lens unit according to the present invention.

FIGS. 1A to 1D are four orthogonal schematic views illustrating the adjusting method for a lens unit according to a first embodiment of the present invention. FIG. 2 is a main part schematic view of the adjusting method for a lens unit according to the first embodiment. As illustrated in FIGS. 1A, 1D and 2, a lens unit (imaging lens) 10 has a plurality of rotationally-symmetrical lenses and an anamorphic lens, and is used in an image reading apparatus for imaging image information of an original placed on an original table onto an image reading unit (CCD 6), and sequentially reading image information. A lens barrel part (lens barrel) 11 has a cylindrical outer perimeter and retains at least one rotationally-symmetrical lens having a rotationally symmetrical shape with respect to an optical axis 1.

An adjusting lens 12 is formed of an anamorphic lens having at least one surface as an anamorphic surface, and disposed at one end portion of the lens barrel part 11 without being externally in contact with the end portion of the lens barrel part 11.

The adjusting lens 12 of this embodiment is rectangular or substantially rectangular in outer shape. Among the dimensions of the rectangular shape, a longer axis through a center O is a long axis 12b. An axis through the center O and orthogonal to the long axis 12b is a short axis 12c. A flange part 12j retains an optical part 12k having a refraction action of the adjusting lens 12. The flange part 12j is provided with structural parts of three or more convex portions or concave portions. The adjusting lens 12 has a first posture transmitter 12d provided in the central portion of an edge of the adjusting lens 12 on one side with respect to the long axis 12b and two second posture transmitters 12e provided at both ends of an edge of the adjusting lens 12 on the other side.

Each of the first and second posture transmitters 12d and 12e is formed of a box-shaped protrusion (convex structure) and has a plurality of orthogonal portions on a corresponding surface that forms the protrusion. Parts shown by dashed lines are a first adjusting lens retainer 21a and second adjusting lens retainers 21b extending from an adjusting device illustrated in FIG. 2. The first adjusting lens retainer 21a and the second adjusting lens retainers 21b respectively retain the first and second posture transmitters 12d and 12e, and communicate the posture of the adjusting lens 12 to the adjusting device with high accuracy owing to the positions and orthogonality of the first and second posture transmitters 12d and 12e.

Adhesive convex portions (structural parts) 12a are provided to parts of the adjusting lens 12 on the side closer to the lens barrel 11, and retained to the lens barrel 11 via adhesion layers 13. The adhesion layers 13 are a liquid resin applied after the adjustment of the lens unit 10, and harden when irradiated with ultraviolet rays after the application, thereby enabling an adjusted state to be retained permanently.

Hereinafter, a configuration of the adjusting device at the time of performing the adjusting method for a lens unit according to the first embodiment of the present invention is described. In FIG. 2, a light source apparatus (illumination apparatus) 22 illuminates a transmission type chart (adjusted chart) 23 from behind. The lens unit 10 is disposed on a lens barrel retainer 24, which is a component of the adjusting device. The adjusting lens 12 is adjusted in six directions including three axial directions orthogonal to one another (X, Y and Z directions) and three tilt directions around the three axes. One-dimensional photoelectric transducers (CCD) 25 obtain data of the transmission type chart 23 as moving in the direction of the optical axis 1, indicated by the arrow in the figure.

In the transmission type chart 23, evaluation parts 23R, 23C and 23L are provided in the center (central angle of field) and perimeters on both sides (both end portions), respectively. In each of the evaluation parts 23R, 23C and 23L, transmissive and non-transmissive thin lines (rectangular patterns) are arranged at intervals in an array direction of pixels of the one-dimensional photoelectric transducers 25. Images of the evaluation parts 23R, 23C and 23L are projected by the lens unit 10 on the surface of the photoelectric transducers 25, and the photoelectric transducers 25 read the chart of the evaluation parts. Data read by the photoelectric transducers 25 is processed by an image processor 26, with the result that contrast transfer function (CTF) values are obtained.

The CTF values obtained by the image processor 26 are displayed on a display 27. On the display 27, a graph is displayed for each of the evaluation parts 23L, 23C and 23R. The horizontal axis of the graph on the display 27 represents a position of the photoelectric transducers 25 in the optical axis direction and the vertical axis represents a CTF value, and so-called contrast depth characteristics are displayed.

Hereinafter, an adjustment procedure is described with reference to FIG. 2 and a flowchart of FIG. 3. At the beginning of the adjustment, specification determination for a focal depth range (referred as depth range) is performed. In the case where a specification of the depth range is met, the processing proceeds to the next step. However, in the case where the specification of the depth range is not met, the lens barrel 11 is rotated in increments of a predetermined amount with respect to the symmetry axes of the rotationally-symmetrical lenses until the specification is met.

Figure 4:
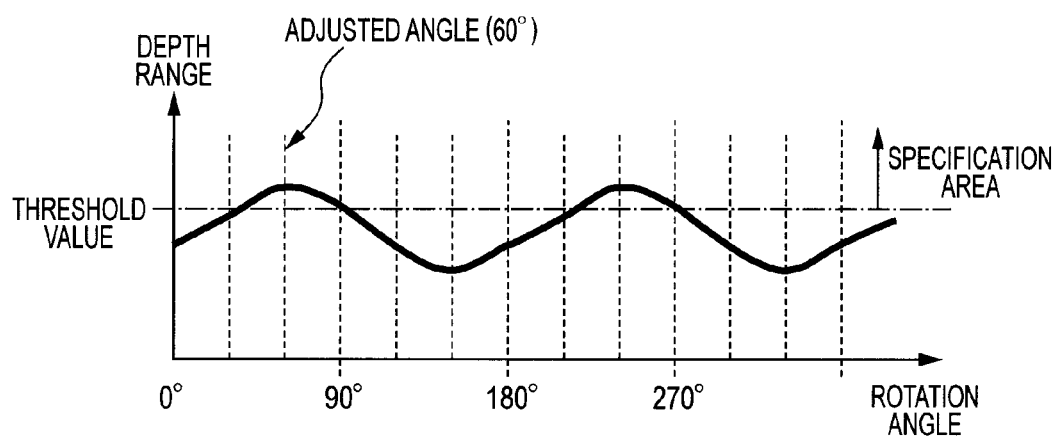
FIG. 4 is a graph illustrating variation of a focal depth range with respect to rotation of a lens barrel of the present invention.

FIG. 4 is a graph illustrating variation of the depth range with respect to rotation of the lens barrel of the present invention. As illustrated in FIG. 4, the depth range behaves as trigonometric function having a period of 180° during the lens barrel being rotated. Since a value of the depth range appears repetitively as trigonometric function even if the rotation angle of the lens barrel being over 180°, rotation angles of the lens barrel, where the depth range has a best value in a specification area which is greater than or equal to a threshold value, can be found. In FIG. 4, the rotational angle is adjusted to 60°.

After the adjustment above, when it is reconfirmed that the depth range is in the specification area, that is, the depth range meets its specification, the progressing proceeds to the next step. However, if it is not reconfirmed by any reason such as accuracy variations or the like that the depth range meets its specification, the progressing returns to the step of rotation of the lens barrel.

Figure 5:
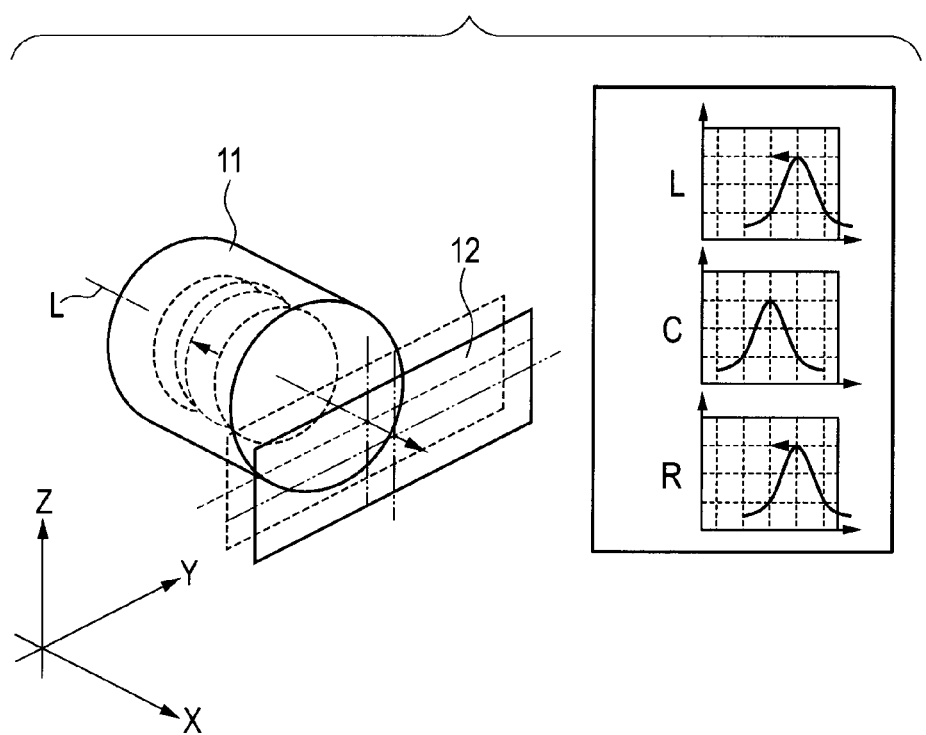
FIG. 5 is a main part schematic view illustrating the adjusting method for a lens unit according to the present invention.

Subsequently, in order to correct field curvature, the adjusting lens 12 is shifted in the optical axis direction, which is the X direction in FIG. 2. In addition, tilt adjustment is performed around the Z axis. Here, field curvature refers to a phenomenon in which the contrast peak positions of the perimeters on both sides of the screen are displaced from the contrast peak position of the screen center in the optical axis direction as illustrated in FIG. 5. As illustrated in the perspective view of FIG. 5, field curvature may occur, for example, in the case where a lens inside the lens barrel 11 is displaced in the optical axis direction. According to this embodiment, this is corrected by shifting the adjusting lens 12 in the direction of an optical axis L.

Figure 6:
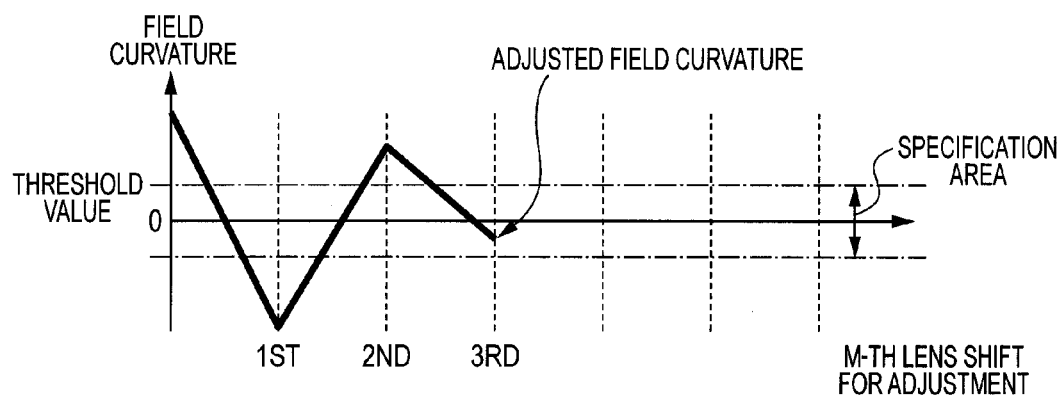
FIG. 6 is a graph illustrating variation of field curvature in the case where an adjusting lens is shifted in an optical axis direction.

FIG. 6 is a graph illustrating variation of the field curvature in the case where the adjusting lens 12 is shifted in an optical axis direction L. A specification of the field curvature includes an upper threshold value and a lower threshold value unlike the specification of the depth range. As illustrated in FIG. 6, when the adjusting lens is shifted in the optical axis direction L, the field curvature changes. In the case where, by shift of the adjusting lens, the field curvature comes out of a specification area which is greater than or equal to the lower threshold value and is smaller than or equal to the upper threshold value, a sensitivity is calculated from the shift amount of the adjusting lens and the variation of the field curvature, and the adjusting lens is returned in an amount with respect to the field curvature coming in the specification area.

By dividing the variation of the field curvature by the shift amount of the adjusting lens, the sensitivity can be obtained as a variation of the field curvature per a unit shift amount of adjusting lens. Therefore, if a required variation of the field curvature to come in the specification area from the present state is known, a required shift amount of the adjusting lens can be obtained and number of adjustment can be reduced.

An adjusting tool has adjusting variation by backlash because the tool includes gears or the like. Hence, the field curvature does always not come in the specification by the first adjustment. In the example of FIG. 6, the field curvature comes in the specification by the third adjustment.

Figure 7:
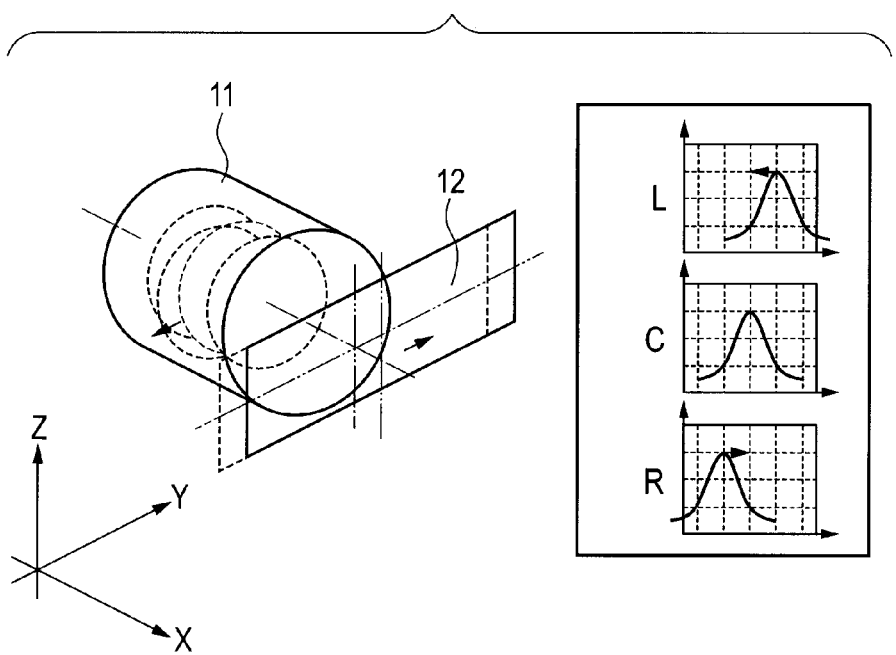
FIG. 7 is a main part schematic view illustrating the adjusting method for a lens unit according to the present invention.

After the adjustment, specification determination is performed. In the case where specifications are met, the adjusting lens 12 is subsequently shifted in the array direction of the photoelectric transducers 25, which is the Y direction in the figure, in order to perform asymmetric blur correction. In addition, tilt adjustment is performed around the Z axis. Asymmetric blur refers to a phenomenon in which the contrast peak positions of the perimeters on both sides of the screen are displaced from each other in the optical axis direction as illustrated in FIG. 7. As illustrated in the perspective view of FIG. 7, asymmetric blur may occur, for example, in the case where a lens inside the lens barrel 11 is decentered in the array direction of the photoelectric transducers 25 (Y direction). According to this embodiment, this is corrected by decenterizing the adjusting lens 12 (by performing tilt adjustment).

Figure 8:
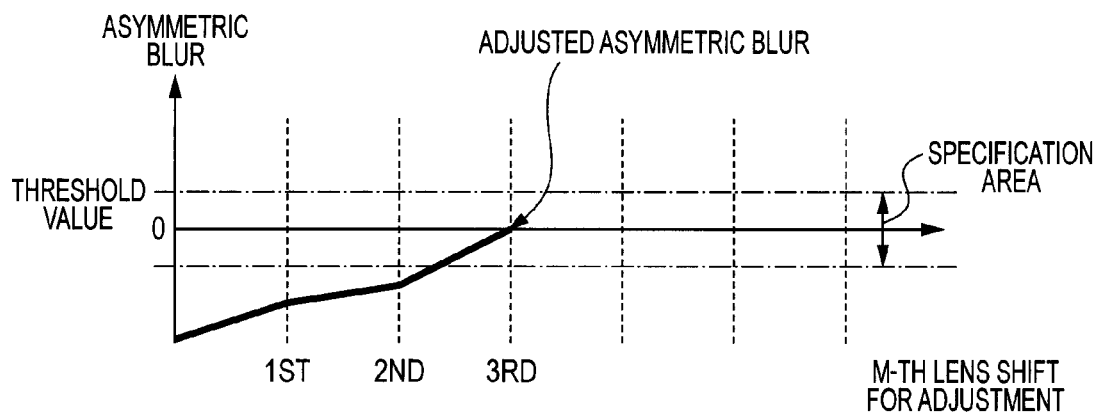
FIG. 8 is a graph illustrating variation of asymmetric blur in the case where the adjusting lens is shifted in an array direction of photoelectric transducers.

FIG. 8 is a graph illustrating variation of asymmetric blur in the case where the adjusting lens is shifted in the array direction of the photoelectric transducers.

A specification of the asymmetric blur includes an upper threshold value and a lower threshold value as with the specification of the field curvature. As illustrated in FIG. 8, when the adjusting lens is shifted in the array direction of the photoelectric transducers, the asymmetric blur changes. In the case where, by the shift of the adjusting lens, the asymmetric blur comes out of a specification area which is greater than or equal to the lower threshold value and is smaller than or equal to the upper threshold value, as with the adjustment of the filed curvature, a sensitivity is calculated from the shift amount of the adjusting lens and the variation of the asymmetric blur. Then, the adjusting lens is further shifted in an amount with respect to the asymmetric blur coming in the specification are. The adjusting tool has adjusting variation by backlash because the tool includes the gears or the like. Hence, asymmetric blur does always not come in the specification are by the first adjustment. In the example of FIG. 8, the asymmetric blur comes in the specification by the third adjustment.

Figure 9:
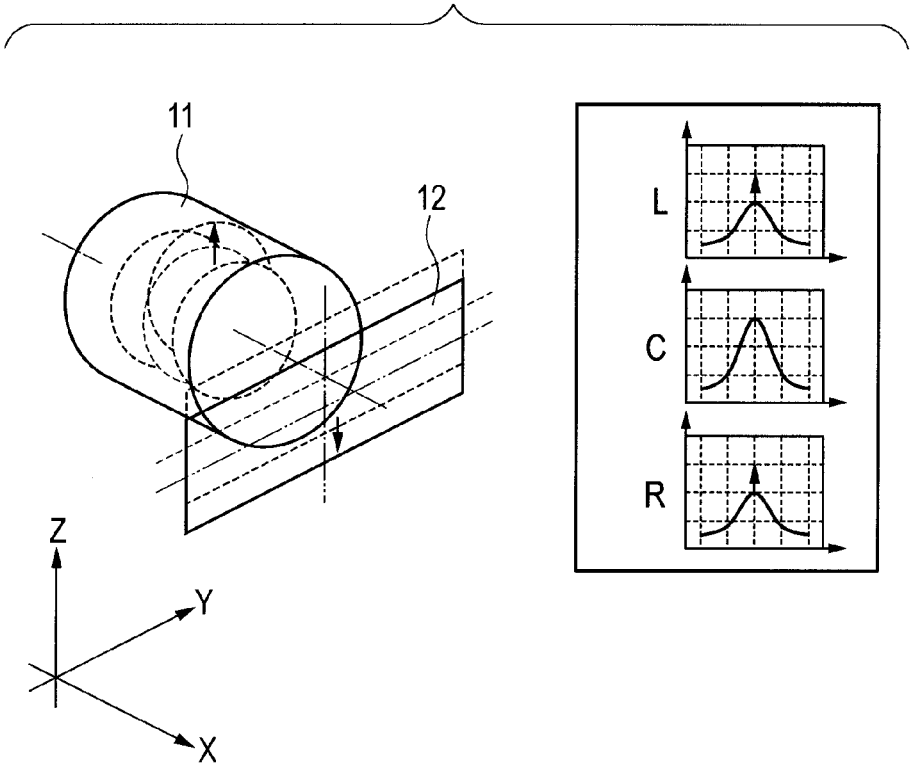
FIG. 9 is a main part schematic view illustrating the adjusting method for a lens unit according to the present invention.

After the adjustment, specification determination is performed. In the case where specifications are met, the adjusting lens 12 is subsequently shifted in a direction orthogonal to the array direction of the photoelectric transducers 25, which is the Z direction in the figure, in order to correct CTF peak value reduction. In addition, tilt adjustment is performed around the Y axis. CTF peak value reduction refers to a phenomenon in which contrast peak values are reduced as illustrated in FIG. 9. As illustrated in the perspective view, CTF peak value reduction may occur, for example, in the case where a lens inside the lens barrel 11 is decentered in the direction orthogonal to the array of the photoelectric transducers 25 (Z direction). According to this embodiment, this is corrected by decenterizing the adjusting lens 12.

Figure 10:
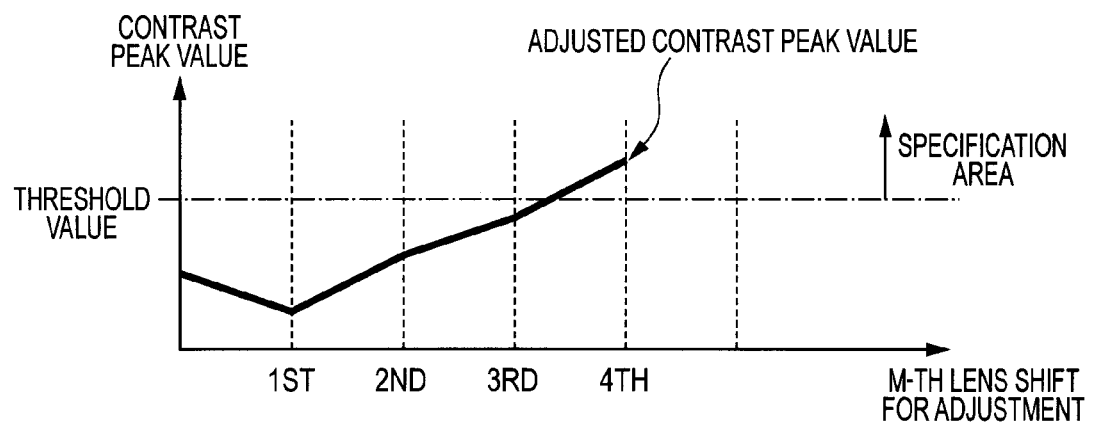
FIG. 10 is a graph illustrating variation of a contrast peak value in the case where the adjusting lens is shifted in a direction orthogonal to the array of the photoelectric transducers.

FIG. 10 is a graph illustrating variation of the contrast peak value in the case where the adjusting lens is shifted in the direction orthogonal to the array of the photoelectric transducers (Z direction).

A specification of the contrast peak value includes only a lower threshold value, as with the specification of the depth range. As illustrated in FIG. 10, when the adjusting lens is shifted in the direction orthogonal to the array of the photoelectric transducers, the contrast peak value changes. A shift orientation of the adjusting lens in the direction orthogonal to the array of the photoelectric transducers is determined according to the change of the contrast peak value. As illustrated in FIG. 10, the contrast peak value is reduced by the shift of the adjusting lens for the first adjustment. Therefore, the shift orientation of the adjusting lens from the second adjustment is opposite to the one for the first adjustment. From the second adjustment, the adjusting lens is repeatedly shifted keeping the shift orientation for the second adjustment until the contrast peak value is greater than or equal to the lower threshold value. In the example of FIG. 10, the contrast peak value meets its specification at the fourth adjustment.

Figure 3:
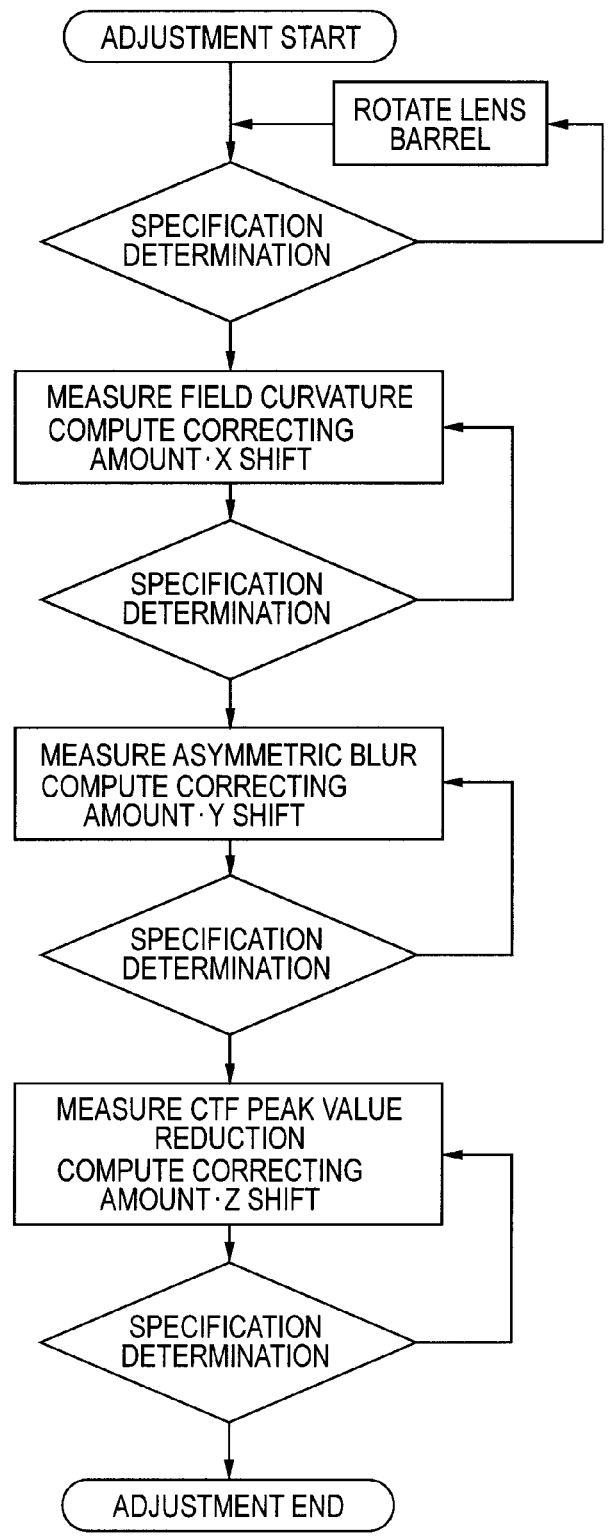
FIG. 3 is a flowchart illustrating the adjusting method for a lens unit according to the present invention.

After undergoing the above-mentioned processes, the adjustment is ended as illustrated in the flowchart of FIG. 3.

The method to determine the shift amount of the adjusting lens by calculating the sensitivity in the process has particularly advantage for adjusting the field curvature and the asymmetric blur. In this embodiment, the sensitivities are calculated in the processes. However, this is not limited, and a sensitivity which is preliminarily obtained from a design simulation or the like may be used.

In this embodiment, it is preferred that at least two angles of field (angles of field of both end portions) be set between −95% and −60% and between +60% and +95%, respectively, of the maximum specified angle of field of the lens unit. In addition, it is preferred that at least one angle of field be set between −40% and +40%. This facilitates identification of adjusting directions and their adjustment quantities in view of correlations among measured characteristics, with the result that efficient adjustment can be obtained.

After the adjustment, the adhesive 13 is applied between the lens barrel 11 and the adjusting lens 12 and then hardened to complete the adjustment of the lens unit 10. Further, the lens barrel 11 is rotationally adjusted with respect to the symmetry axes of the rotationally-symmetrical lenses. The completed lens unit 10 is set in an image reading apparatus, to thereby achieve a compact and high-performance image reading apparatus.

Figure 11:
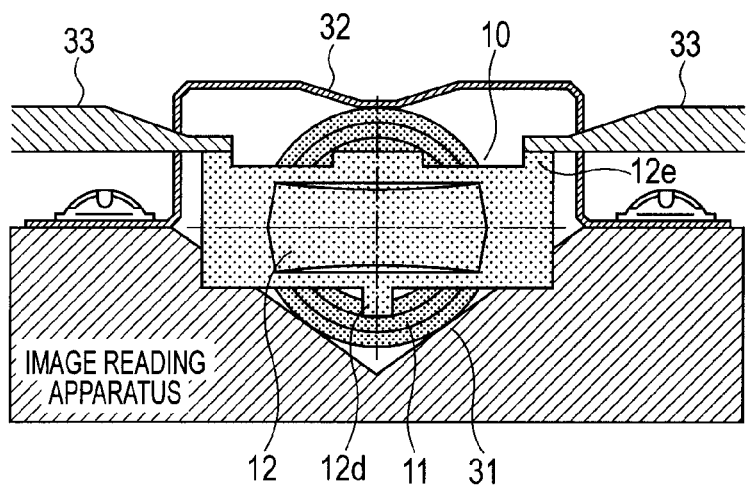
FIG. 11 is a main part schematic view illustrating a structure for fixing a lens unit to an image reading apparatus according to the present invention.

FIG. 11 is a main part schematic view illustrating a state in which the lens unit 10 is set in an image reading apparatus. As for the lens unit 10, one side of the outer perimeter of the lens barrel 11 is in contact with a lens stationary part 31 inside the image reading apparatus, and the other side of the outer perimeter of the lens barrel 11 is fixed to the lens stationary part 31 by a stationary spring 32. In order to conform an array direction of the photoelectric transducers (not shown) of the image reading apparatus to the direction of the lens unit 10, position adjusters 33 (adjusting lens retainers 21*b*) are thrust against the second posture transmitters 12*e* of the adjusting lens 12.

Figure 12:
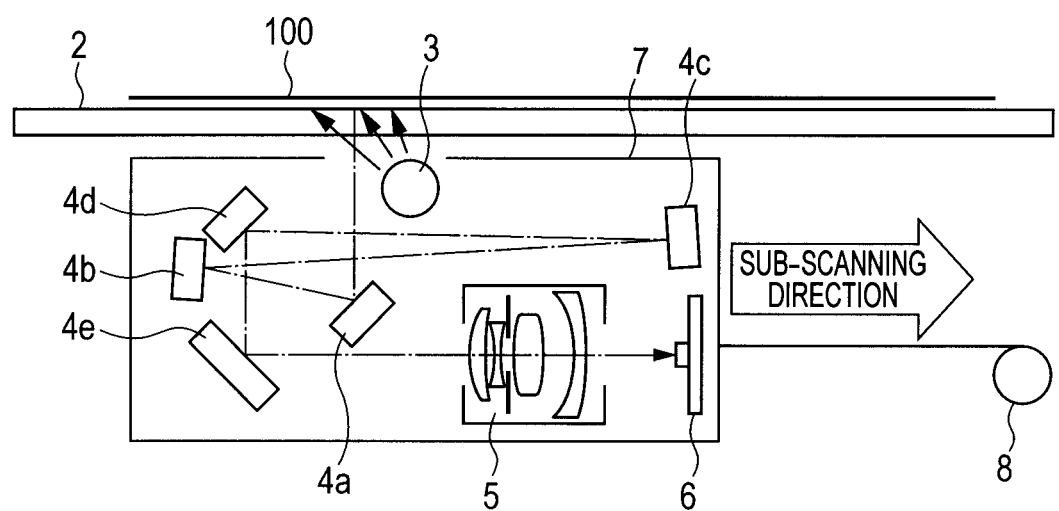
FIG. 12 is a schematic view illustrating a configuration of the image reading apparatus according to the present invention.

FIG. 12 is a main part schematic view of an image forming apparatus using a lens unit which is adjusted by the adjusting method for a lens unit according to the present invention.

In the following description, the main scanning direction refers to a direction in which pixels of the line sensor are aligned, and the sub-scanning direction refers to a direction perpendicular to the direction of the pixel alignment of the line sensor.

In the figure, an original 100 is placed on the surface of an original table glass (original table) 2. A carriage (casing) 7 integrally houses an illumination system 3, a plurality of reflection mirrors 4*a*, 4*b*, 4*c*, 4*d* and 4*e*, the lens unit 10, a reading unit 6 and the like. The carriage 7 moves in the sub-scanning direction (direction of the arrow in FIG. 12) by a sub-scanning mechanism 8, such as a sub-scanning motor. The illumination system 3 is formed of, for example, a xenon tube, a halogen lamp or an LED array. A reflector, such as an aluminum vapor deposited plate, may be incorporated into the illumination system 3.

The reflection mirrors 4a, 4b, 4c, 4d and 4e are sequentially first, second, third, fourth and fifth reflection mirrors, respectively, and bend the optical path of a beam from the original 100 inside the carriage 7. The lens unit 10 images the beam based on the image information of the original 100 onto the surface of the reading unit 6. The lens unit 10 according to this embodiment includes rotationally-symmetrical lenses and a rectangular-shaped lens having at least one surface formed into an anamorphic shape (hereinafter, referred to as "anamorphic lens"). The reading unit 6 is formed of a line sensor (CCD or CMOS), and has a structure in which a plurality of light receiving elements are arranged in a one-dimensional direction (main scanning direction).

In this embodiment, a beam emitted from the illumination system 3 is projected onto the original 100 directly or via a reflector (not shown). Then, the optical path of the beam reflected from the original 100 is bent inside the carriage 7 sequentially via the first, second, third, fourth and fifth reflection mirrors 4a, 4b, 4c, 4d and 4e. Then, the image information of the original 100 is imaged by the lens unit 10 onto the surface of the line sensor.

Then, by moving the carriage 7 in the sub-scanning direction (direction of the arrow in FIG. 12) by the sub-scanning motor 8, the image information of the original 100 is read two-dimensionally. Then, the read image information is sent to, for example, a personal computer or a printer, which is an external apparatus, through an interface (not shown).

The lens unit 10 of this embodiment retains rotationally-symmetrical lenses inside the lens barrel 11 as described above. The lens unit 10 also retains the adjusting lens 12, which is formed of a rectangular anamorphic lens, outside (at one end portion) of the lens barrel 11 after positioning of the adjusting lens 12 is performed.

Second Embodiment

Hereinafter, a structure regarding an adjusting method for a lens unit according to a second embodiment of the present invention is described with reference to FIGS. 13A to 13D. In FIGS. 13A to 13D, the same reference numerals are given to the components which are common to those of FIGS. 1A to 1D. The lens unit 10 of this embodiment is adjusted in the same manner as in the first embodiment and mounted on an image reading apparatus, to thereby achieve a compact and high-performance image reading apparatus.

Figure 13A:
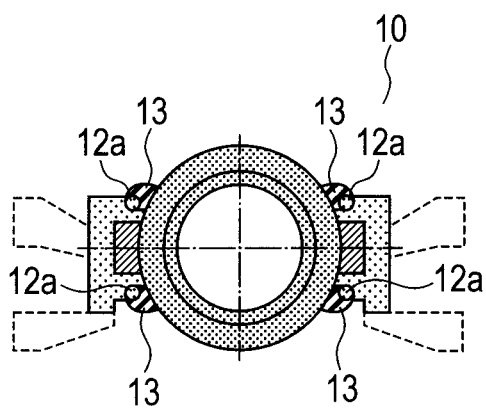
FIG. 13A is a main part schematic view illustrating an adjusting method for a lens unit according to a second embodiment of the present invention.
Figure 13B:
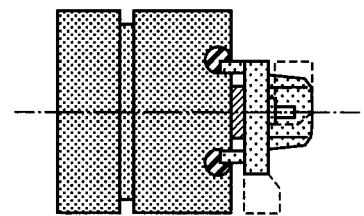
FIG. 13B is a main part schematic view illustrating the adjusting method for a lens unit according to the second embodiment of the present invention.
Figure 13C:
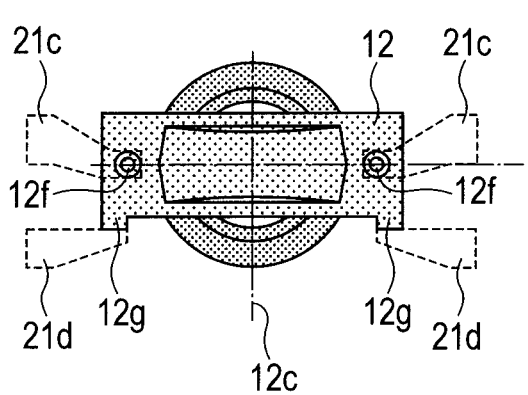
FIG. 13C is a main part schematic view illustrating the adjusting method for a lens unit according to the second embodiment of the present invention.
Figure 13D:
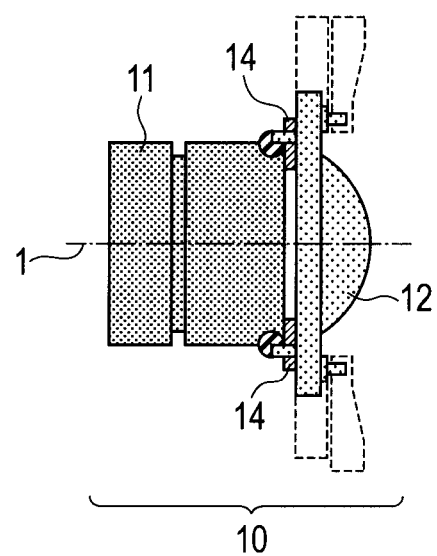
FIG. 13D is a main part schematic view illustrating the adjusting method for a lens unit according to the second embodiment of the present invention.

Hereinafter, differences from the first embodiment are described. In FIG. 13D, the structure in which the cylindrical lens barrel 11 retains at least one rotationally-symmetrical lens having a rotationally symmetrical shape with respect to the optical axis 1 is the same as in the first embodiment. This embodiment is different from the first embodiment in the retaining method for the relative positions of the lens barrel 11 and the adjusting lens 12. By retaining third posture transmitters 12f and fourth posture transmitters 12g using third adjusting lens retainers 21c and fourth adjusting lens retainers 21d, respectively, the posture of the adjusting lens 12 is retained with high accuracy.

The adjusting lens 12 is disposed at one end portion of the lens barrel 11 without being externally in contact with the end portion of the lens barrel 11, but the adjusting lens 12 is adjusted and retained via spacers (distance-keeping members) 14 in order to retain the relative posture with respect to the lens barrel 11. As for the spacers 14, appropriate thickness or number of pieces thereof is selected according to a gap created between the lens barrel 11 and the adjusting lens 12 after the adjustment following the flowchart in FIG. 3, and then the spacers 14 are inserted. In the case where the usage environment of the image reading apparatus is particularly severe, such as a hot and humid environment, the adhesive 13 expands and contracts due to changes in humidity, temperature and the like, which may cause displacement of the adjusted position.

According to this embodiment, the adjusting lens 12 is fixed with an adhesive (adhesion layers) after the position of the adjusting lens 12 in the optical axis direction is regulated by the spacers 14, thereby enabling the lens unit 10 having sensitive adjustment accuracy in the optical axis direction to ensure stability capable of withstanding severe usage environments.

Third Embodiment

Hereinafter, a structure for an adjusting method for the lens unit 10 according to a third embodiment of the present invention is described with reference to FIGS. 14A to 14D. In FIGS. 14A to 14D, the same reference numerals are given to the components which are common to those of FIGS. 1A to 1D. The lens unit 10 of this embodiment is also adjusted in the same manner as in the first embodiment and mounted on an image reading apparatus, to thereby achieve a compact and high-performance image reading apparatus.

Figure 14A:
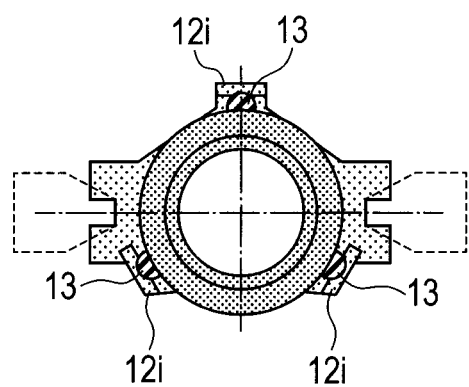
FIG. 14A is a main part schematic view illustrating an adjusting method for a lens unit according to a third embodiment of the present invention.
Figure 14B:
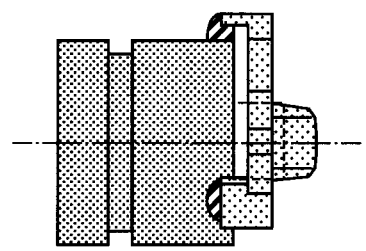
FIG. 14B is a main part schematic view illustrating the adjusting method for a lens unit according to the third embodiment of the present invention.
Figure 14C:
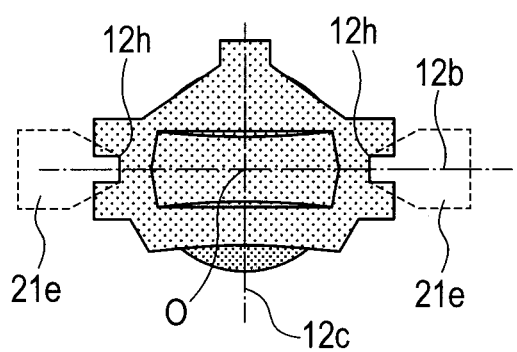
FIG. 14C is a main part schematic view illustrating the adjusting method for a lens unit according to the third embodiment of the present invention.
Figure 14D:
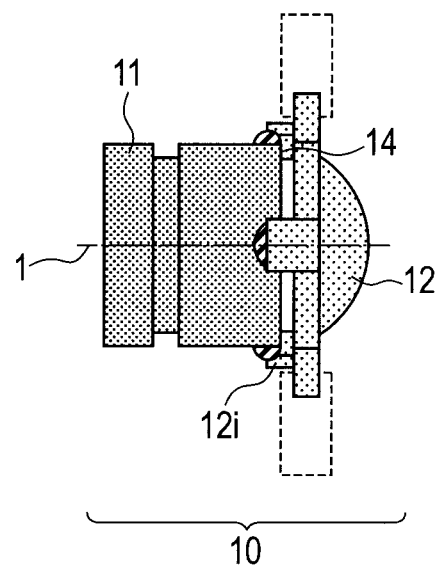
FIG. 14D is a main part schematic view illustrating the adjusting method for a lens unit according to the third embodiment of the present invention.

Hereinafter, differences from the first embodiment are described. In FIG. 14D, the structure in which the cylindrical lens barrel 11 retains at least one rotationally-symmetrical lens having a rotationally symmetrical shape with respect to the optical axis 1 is the same as in the first embodiment. This embodiment is different from the first embodiment in the retaining method for the relative positions of the lens barrel 11 and the adjusting lens 12. By retaining fifth posture transmitters 12h, each formed of a concave-shaped structure, using fifth adjusting lens retainers 21e, the posture of the adjusting lens 12 is retained with high accuracy. The adjusting lens 12 is disposed at one end portion of the lens barrel 11 without being externally in contact with the end portion of the lens barrel 11, but larger adhesive convex portions 12i are provided in order to retain the relative posture with respect to the lens barrel 11.

As for the spacers 14, appropriate thickness or number of pieces thereof is selected according to a gap created between the lens barrel 11 and the adjusting lens 12 after the adjustment following the flowchart in FIG. 3, and then the spacers 14 are inserted. In order to retain the adjusting lens 12 with high accuracy in particularly severe usage environments, such as a hot and humid environment, as described in the second embodiment, an adhesive having a high strength after hardened may be used or the quantity of an adhesive may be increased. However, in the case where these countermeasures are taken while the adhesion regions are left as they stand, the adjusting lens 12 may become deformed and the optical performance may change before and after the adhesive bonding.

Accordingly, it is preferred that force acting at the time of hardening be distributed by increasing the adhesion regions. This embodiment achieves high performance by increasing the size of the adhesive convex portions 12i. The case in which the present invention is applied to the image reading apparatus is described in each of the foregoing embodiments. However, the present invention is not limited to the case, and may be applied to, for example, a digital copy machine and a fax machine which are used with an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-271500, filed Dec. 6, 2010, No. 2011-264734, filed Dec. 2, 2011 which are hereby incorporated by reference herein in their entirety.

What is claimed is:

1. An adjusting method for a lens unit usable in an image reading apparatus that forms images of an original onto one-dimensional photoelectric transducers using the lens unit and reads image information of the original, the lens unit including a plurality of rotationally-symmetrical lenses, a lens barrel including the plurality of rotationally-symmetrical lenses and an adjusting lens disposed at an end portion of the lens barrel, the adjusting method comprising:

a rotational adjustment step of rotational adjusting the lens barrel with respect to the adjusting lens by rotating the lens barrel around symmetry axes of the plurality of rotationally-symmetrical lenses; and a contrast depth characteristics obtaining step of obtaining contrast depth characteristics of images of a chart formed on the one-dimensional photoelectric transducers corresponding to at least three angles of field of the lens unit; and a positional adjustment step of, according to the contrast depth characteristics obtained in the contrast depth characteristic obtaining step, adjusting a position of the adjusting lens with respect to the lens barrel in at least one of an array direction of the one-dimensional photoelectric transducers, an optical axis direction of the lens unit, or a direction perpendicular to the array direction and the optical axis direction.

2. The adjusting method according to claim 1, wherein: the adjusting lens comprises:
an optical part having a refraction action;
a flange part that retains the optical part; and
a plurality of structural parts provided on the flange part, and
the adjusting method further comprises a fixing step of fixing the adjusting lens to the lens barrel via the plurality of structural parts with an adhesive after rotationally adjusting the lens barrel in the rotational adjustment step and adjusting the position of the adjusting lens in the positional adjustment step.

3. The adjusting method according to claim 1, further comprising a tilt adjustment step of adjusting a tilt of the adjusting lens with respect to the lens barrel around at least one of the array direction, the optical axis direction, or the direction perpendicular to the array direction and the optical axis direction.

4. The adjusting method according to claim 1, wherein:
the positional adjustment step adjusts the position of the adjusting lens with respect to the lens barrel using a spacer,
wherein the adjusting method further comprises a fixing step of fixing the adjusting lens to the lens barrel with an adhesive after adjusting the position of the adjusting lens with respect to the lens barrel using the spacer in the positional adjustment step.

5. The adjusting method according to claim 1, wherein the adjusting lens has an anamorphic surface.

6. The adjusting method according to claim 1, wherein:
the at least three angles of field of the lens unit comprise a central angle of field and angles of field of both end portions with respect to the central angle of field, and
wherein the contrast depth characteristics adjustment step obtains the contrast depth characteristics of the images of the chart corresponding to the central angle of field and the angles of field of both the end portions with respect to the central angle of field.

7. The adjusting method according to claim 6, wherein the positional adjustment step adjusts the adjusting lens by moving the adjusting lens in one of the optical axis direction or the array direction to reduce a difference of contrast peak positions of the images of the chart corresponding to the angles of field of both the end portions with respect to the central angle of field, from a contrast peak position of the image of the chart corresponding to the central angle of field.

8. The adjusting method according to claim 6, wherein the positional adjustment step adjusts the adjusting lens by moving the adjusting lens in the direction perpendicular to the array direction and the optical axis direction to reduce a difference of contrast peak values of the images of the chart corresponding to the angles of field of both the end portions with respect to the central angle of field, from a contrast peak value of the image of the chart corresponding to the central angle of field.

9. A method of producing a lens unit usable in an image reading apparatus that forms images of an original onto one-dimensional photoelectric transducers using the lens unit and reads image information of the original, the lens unit including a plurality of rotationally-symmetrical lenses, a lens barrel including the plurality of rotationally-symmetrical lenses, and an adjusting lens disposed at an end portion of the lens barrel, the method comprising:

a rotational adjustment step of rotationally adjusting the lens barrel with respect to the adjusting lens by rotating the lens barrel around symmetry axes of the plurality of rotationally-symmetrical lenses;

a contrast depth characteristics obtaining step of obtaining contrast depth characteristics of images of a chart formed on the one-dimensional photoelectric transducers corresponding to at least three angles of field of the lens unit; and a positional adjustment step of, according to the contrast depth characteristics obtained in the contrast depth characteristics obtaining step, adjusting a position of the adjusting lens with respect to the lens barrel in at least one of an array direction of the one-dimensional photoelectric transducers, an optical axis direction of the lens unit, or a direction perpendicular to the array direction and the optical axis direction.

10. The method according to claim 9, wherein:
the adjusting lens comprises:
an optical part having a refraction action;
a flange part that retains the optical part; and
a plurality of structural parts provided on the flange part, and
the method further comprises a fixing step of fixing the adjusting lens to the lens barrel via the plurality of structural parts with an adhesive after rotationally adjusting the lens barrel in the rotational adjustment step and adjusting the position of the adjusting lens in the positional adjustment step.

11. The method according to claim 9, further comprising a tilt adjusting step of tilt adjusting the adjusting lens with respect to the lens barrel around at least one of the array direction, the optical axis direction, or the direction perpendicular to the array direction and the optical axis direction.

12. The method according to claim 9, wherein:
the positional adjustment step adjusts the position of the adjusting lens with respect to the lens barrel using a spacer, and
the method further comprises a fixing step of fixing the adjusting lens to the lens barrel with an adhesive after adjusting the position of the adjusting lens with respect to the lens barrel using the spacer in the positional adjustment step.

13. The method according to claim 9, wherein the adjusting lens has an anamorphic surface.

14. The method according to claim 9, wherein:
the at least three angles of field of the lens unit comprise a central angle of field and angles of field of both end portions with respect to the central angle of field, and
the contrast depth characteristics obtaining step obtains the contrast depth characteristics of the images of the chart corresponding to the central angle of field and the angles of field of both the end portions with respect to the central angle of field.

15. The method according to claim 14, wherein the positional adjustment step adjusts the position of the adjusting lens by moving the adjusting lens in one of the optical axis direction or the array direction to reduce a difference of contrast peak positions of the images of the chart corresponding to the angles of field of both the end portions with respect to the central angle of field, from a contrast peak position of the image of the chart corresponding to the central angle of field.

16. The method according to claim 14, wherein the positional adjustment step adjusts the position of the adjusting lens by moving the adjusting lens in the direction perpendicular to the array direction and the optical axis direction to reduce a difference of contrast peak values of the images of the chart corresponding to the angles of field of both the end portions with respect to the central angle of field, from a contrast peak value of the image of the chart corresponding to the central angle of field.

17. The method according to claim 9, further comprising a setting step of setting the lens unit in the image reading apparatus.

* * * * *